US008601015B1

(12) United States Patent  
Wolfram et al.

(10) Patent No.: US 8,601,015 B1  
(45) Date of Patent: Dec. 3, 2013

(54) DYNAMIC EXAMPLE GENERATION FOR QUERIES

(75) Inventors: Stephen Wolfram, Champaign, IL (US); Wiktor Macura, Rossville, IL (US)

(73) Assignee: Wolfram Alpha LLC, Champaign, IL (US)

( * ) Notice: Subject to any disclaimer, the term of this patent is extended or adjusted under 35 U.S.C. 154(b) by 397 days.

(21) Appl. No.: 12/780,670

(22) Filed: May 14, 2010

Related U.S. Application Data

(60) Provisional application No. 61/178,845, filed on May 15, 2009.

(51) Int. Cl.  
*G06F 17/30* (2006.01)

(52) U.S. Cl.  
USPC .......................................... 707/759; 707/779

(58) Field of Classification Search  
USPC .................. 707/767, 772, 774, 759, 765, 779  
See application file for complete search history.

(56) References Cited

U.S. PATENT DOCUMENTS

| | | |
|---|---|---|
| 4,734,854 A | 3/1988 | Afshar |
| 4,740,886 A | 4/1988 | Tanifuji et al. |
| 4,841,441 A | 6/1989 | Nixon et al. |
| 4,949,253 A | 8/1990 | Chigira et al. |
| 5,038,296 A | 8/1991 | Sano |
| 5,315,710 A | 5/1994 | Kishimoto et al. |
| 5,394,509 A | 2/1995 | Winston |
| 5,448,740 A | 9/1995 | Kiri et al. |
| 5,485,601 A | 1/1996 | Ching |
| 5,499,371 A | 3/1996 | Henninger et al. |
| 5,555,367 A | 9/1996 | Premerlani et al. |
| 5,559,939 A | 9/1996 | Wada et al. |
| 5,634,024 A | 5/1997 | Yamaguchi |
| 5,640,576 A | 6/1997 | Kobayashi et al. |
| 5,696,962 A | 12/1997 | Kupiec |
| 5,768,590 A | 6/1998 | Kimura et al. |
| 5,815,713 A | 9/1998 | Sanders |
| 5,815,717 A | 9/1998 | Stack |
| 5,987,505 A | 11/1999 | Fry et al. |
| 6,038,560 A | 3/2000 | Wical |
| 6,076,051 A | 6/2000 | Messerly et al. |
| 6,084,585 A | 7/2000 | Kraft et al. |

(Continued)

FOREIGN PATENT DOCUMENTS

| | | |
|---|---|---|
| EP | 0 442 240 A2 | 8/1991 |
| WO | WO-97/40425 A2 | 10/1997 |
| WO | WO-2006/014892 A2 | 2/2006 |
| WO | WO-2006/015006 A2 | 2/2006 |

OTHER PUBLICATIONS

Rosie Jones et al., "Generating Query Substitutions", ACM WWW 2006, May 23-26, 2006, pp. 387-396.*

(Continued)

*Primary Examiner* — Rehana Perveen  
*Assistant Examiner* — Scott A Waldron  
(74) *Attorney, Agent, or Firm* — Marshall, Gerstein & Borun LLP

(57) ABSTRACT

In a method for generating example queries, an actual query is received, and the actual query is portioned into one or more tokens. One or more fragments of the actual query are generated based on reassembly of the one or more tokens. A plurality of example queries are generated based on different interpretations of one or more fragments, and at least one example query is outputted.

18 Claims, 10 Drawing Sheets

(56) References Cited

U.S. PATENT DOCUMENTS

| | | | |
|---|---|---|---|
| 6,144,989 A | | 11/2000 | Hodjat et al. |
| 6,169,986 B1 * | | 1/2001 | Bowman et al. ....... 707/999.005 |
| 6,173,441 B1 | | 1/2001 | Klein |
| 6,216,139 B1 | | 4/2001 | Listou |
| 6,256,665 B1 | | 7/2001 | Fry et al. |
| 6,275,976 B1 | | 8/2001 | Scandura |
| 6,289,513 B1 | | 9/2001 | Bentwich |
| 6,493,694 B1 | | 12/2002 | Xu et al. |
| 6,502,236 B1 | | 12/2002 | Allen et al. |
| 6,505,157 B1 | | 1/2003 | Elworthy |
| 6,584,464 B1 | | 6/2003 | Warthen |
| 6,589,290 B1 | | 7/2003 | Maxwell et al. |
| 6,675,159 B1 | | 1/2004 | Lin et al. |
| 6,684,388 B1 | | 1/2004 | Gupta et al. |
| 6,704,728 B1 | | 3/2004 | Chang et al. |
| 6,742,162 B2 | | 5/2004 | Bennett |
| 6,876,314 B1 | | 4/2005 | Lin |
| 6,877,155 B1 | | 4/2005 | Lindsey |
| 6,901,399 B1 | | 5/2005 | Corston et al. |
| 6,973,640 B2 | | 12/2005 | Little et al. |
| 6,996,801 B2 | | 2/2006 | Yoneyama |
| 7,120,574 B2 | | 10/2006 | Troyanova et al. |
| 7,137,100 B2 | | 11/2006 | Iborra et al. |
| 7,197,739 B2 | | 3/2007 | Preston et al. |
| 7,222,333 B1 | | 5/2007 | Mor et al. |
| 7,231,343 B1 | | 6/2007 | Treadgold et al. |
| 7,263,517 B2 | | 8/2007 | Sheu et al. |
| 7,269,822 B2 | | 9/2007 | Gebhart et al. |
| 7,373,291 B2 | | 5/2008 | Garst |
| 7,403,938 B2 * | | 7/2008 | Harrison et al. ....... 707/999.003 |
| 7,440,968 B1 | | 10/2008 | Oztekin et al. |
| 7,451,135 B2 | | 11/2008 | Goldman et al. |
| 7,454,701 B2 | | 11/2008 | Graeber |
| 7,613,676 B2 | | 11/2009 | Baisley et al. |
| 7,620,935 B2 | | 11/2009 | Baisley et al. |
| 7,685,507 B2 | | 3/2010 | Workman et al. |
| 7,747,601 B2 | | 6/2010 | Cooper et al. |
| 7,844,594 B1 | | 11/2010 | Holt et al. |
| 7,870,147 B2 * | | 1/2011 | Bailey et al. ................. 707/767 |
| 7,895,221 B2 * | | 2/2011 | Colledge et al. ............. 707/758 |
| 8,091,024 B2 | | 1/2012 | Graeber |
| 8,135,696 B2 | | 3/2012 | Safoutin |
| 2002/0099743 A1 | | 7/2002 | Workman et al. |
| 2002/0116176 A1 | | 8/2002 | Tsourikov et al. |
| 2002/0140734 A1 | | 10/2002 | Bennett |
| 2002/0143810 A1 | | 10/2002 | Bennett |
| 2002/0174120 A1 | | 11/2002 | Zhang et al. |
| 2003/0145022 A1 | | 7/2003 | Dingley |
| 2003/0191765 A1 | | 10/2003 | Bargh et al. |
| 2004/0001109 A1 | | 1/2004 | Blancett et al. |
| 2004/0049499 A1 | | 3/2004 | Nomoto et al. |
| 2004/0088158 A1 | | 5/2004 | Sheu et al. |
| 2004/0103405 A1 | | 5/2004 | Vargas |
| 2004/0128649 A1 | | 7/2004 | Grundy et al. |
| 2005/0005258 A1 | | 1/2005 | Bhogal et al. |
| 2005/0080780 A1 | | 4/2005 | Colledge et al. |
| 2005/0097464 A1 | | 5/2005 | Graeber |
| 2006/0020886 A1 | | 1/2006 | Agrawal et al. |
| 2006/0025987 A1 | | 2/2006 | Baisley et al. |
| 2006/0026576 A1 | | 2/2006 | Baisley et al. |
| 2006/0136411 A1 | | 6/2006 | Meyerzon et al. |
| 2006/0190439 A1 * | | 8/2006 | Chowdhury et al. ............. 707/3 |
| 2006/0271908 A1 | | 11/2006 | Bargh et al. |
| 2006/0279799 A1 | | 12/2006 | Goldman |
| 2007/0022109 A1 | | 1/2007 | Imielinski et al. |
| 2007/0043574 A1 | | 2/2007 | Coffman et al. |
| 2007/0106657 A1 | | 5/2007 | Brzeski et al. |
| 2007/0203929 A1 * | | 8/2007 | Bolivar ........................ 707/101 |
| 2007/0208722 A1 | | 9/2007 | Dettinger et al. |
| 2007/0220034 A1 | | 9/2007 | Iyer et al. |
| 2008/0016040 A1 | | 1/2008 | Jones et al. |
| 2008/0066052 A1 * | | 3/2008 | Wolfram ...................... 717/109 |
| 2009/0055733 A1 | | 2/2009 | Graeber |
| 2009/0171923 A1 | | 7/2009 | Nash et al. |
| 2010/0004924 A1 | | 1/2010 | Paez |
| 2010/0191740 A1 * | | 7/2010 | Lu et al. ........................ 707/748 |
| 2010/0205198 A1 * | | 8/2010 | Mishne et al. ................ 707/759 |
| 2010/0293174 A1 * | | 11/2010 | Bennett et al. ................ 707/759 |

OTHER PUBLICATIONS

Xuanhui Wang & ChenXiang Zhai, "Mining Term Association Patterns from Search Logs for Effective Query Reformulation", ACM CIKM 2008, Oct. 26-30, 2008, pp. 479-488.*
"Microsoft Computer Dictionary", 2002, Microsoft Press, 5th ed., p. 452.*
"AppleScript," Wikipedia.
"Area calculator", http://www.calculator.com, 1 page, Aug. 15, 2006.
"Calculator.com", http://www.calculator.com, 2 pages, Aug. 15, 2006.
"Car Lease Calculator", http://www.calculator.com, 1 page, Aug. 15, 2006.
"Currency Calculator", http://www.calculator.com, 1 page, Aug. 15, 2006.
"Fractions calculator", http://www.calculator.com, 1 page, Aug. 15, 2006.
"General Loan Calculator", http://www.calculator.com, 1 page, Aug. 15, 2006.
"Google Code," http://code.google.com, Mar. 17, 2005, p. 1-11.
"Graphing calculator", http://www.calculator.com, 1 page, Aug. 15, 2006.
"Home—Finance", http://www.calculator.com, 2 pages, Aug. 15, 2006.
"Home Equity Calculator", http://www.calculator.com, 1 page, Aug. 15, 2006.
"How Much Can I Afford Calculator", http://www.calculator.com, 1 page, Aug. 15, 2006.
"Length Adding Calculator", http://www.calculator.com, 1 page, Aug. 15, 2006.
"Love Calculator", http://www.calculator.com, 1 page, Aug. 15, 2006.
"Mortgage Payment Calculator", http://www.calculator.com, 1 page, Aug. 15, 2006.
"Mortgage Qualification Calculator", http://www.calculator.com, 1 page, Aug. 15, 2006.
"Percent calculator", http://www.calculator.com, 1 page, Aug. 15, 2006.
"Rent versus Buy Calculator", http://www.calculator.com, 1 page, Aug. 15, 2006.
"Scientific calculator", http://www.calculator.com, 1 page, Aug. 15, 2006.
"Standard calculator", http://www.calculator.com, 1 page, Aug. 15, 2006.
"Temperature calculator", http://www.calculator.com 1 page, Aug. 15, 2006.
"The Mortgage Calculator," http://www.hughchou.org/calc/mortold.html, Aug. 8, 1996, p. 1-7.
"Time Calculator", http://www.calculator.com 1 page, Aug. 15, 2006.
"Unit Conversion Calculator", http://www.calculator.com 1 page, Aug. 15, 2006.
Adorni, et al., "Natural Language Input for Scene Generation," Proceedings of the first conference on European Chapter of the Association for Computational Linguistics, pp. 175-182 (1983).
Asperti et al., "A content based mathematical search engine: Whelp," 2004, p. 1-15.
Estival et al., "Towards Ontology-Based Natural Language Processing," http://acl.ldc.upenn.edu/acl2004/nlpxml/pdf/estival-etal.pdf, accessed Mar. 8, 2010, 8 pages.
Kamareddine et al., "Restoring Natural Language as a Computerized Mathematics Input Method," Proceedings of the 14th symposium on Towards Mechanized +Mathematical Assistants: 6th International Conference, pp. 280-295 (2007).
Ko et al., "The State of the Art in End-User Software Engineering," accepted for publication in ACM Computing Surveys.
Lavrov, "Program Synthesis," Cybernetics and Systems Analysis, vol. 18, No. 6 pp. 708-715 (Nov. 1982).

(56) References Cited

OTHER PUBLICATIONS

Meyers, A., "VOX—An Extensible Natural Language Processor," http://dli.iiit.ac.in/ijcai/IJCA1-85-VOL2/PDF/026.pdf, accessed Mar. 8, 2010, 5 pages.

Moore, Gregory M., "Calculator Code: Programming Code for Use within a Scientific Calculator," Fall 2005, p. 1-29.

Myers et al., "Natural Programming Languages and Environments," Communications of the ACM, vol. 47, No. 9, pp. 47-52 (Sep. 2004).

Office Action for related U.S. Appl. No. 12/780,685, dated Feb. 15, 2012.

Office Action for related U.S. Appl. No. 12/780,705, dated Jan. 31, 2012.

Osogami, "A Study of Input and Output Conditions for Automatic Program Generation," Memoirs of the Fukui Institute of Technology, vol. 37 pp. 273-278 (2007).

Sucan, Ioan Alexandru, "A Search Engine for Mathematical Formulae," May 7, 2006, p. 1-17.

Trott, Michael, "Mathematical Searching of The Wolfram Functions Site," 2005, The Mathematica Journal, p. 713-726.

Trott, Michael, "The Functions Website," 2003, The Mathematica Journal, p. 1-10.

\* cited by examiner

DYNAMIC EXAMPLE GENERATION FOR QUERIES

CROSS-REFERENCE TO RELATED APPLICATION

This application claims the benefit of U.S. Provisional Patent Application No. 61/178,845, entitled "Dynamic Example Generation for Queries," which was filed on May 15, 2009, the entire disclosure of which is hereby incorporated by reference herein.

BACKGROUND

Search engines, such as Internet search engines, have been in use for some time. Such search engines permit the user to form a search query using combinations of keywords to search through a web page database containing text indices associated with one or more distinct web pages. The search engine looks for matches between the search query and text indices in the web page database, and then returns a number of hits which correspond to URL pointers and text excerpts from the web pages that represent the closest matches.

Some Internet search engines attempt to detect when a user has entered a query incorrectly. For example, the Google™ search engine employs a "Did you mean . . . ?" feature that essentially runs a spellchecker on user queries. The spellchecker attempts to detect when an entered word is misspelled by checking it against a database of common words and their misspellings. When a possible misspelling is detected, the search engine may provide to the user a prompt to invoke an alternative query in which the misspelled word is spelled correctly.

Cyc, an artificial intelligence project for building a knowledge base, provides a response feature for queries it cannot answer. A knowledge base of Cyc uses an extensive ontology that provides relationships between entities. "A town contains houses" and "a car can drive on roads" are examples of relationships coded into the ontology. When a user submits a query asking a question that Cyc can't answer, for example, "can a car drive on a handrail?" Cyc will provide to the user the closest set of inferences it has made in attempting to answer the query, such as "a car can drive on roads." These responses thus merely show inferences made by the inference system.

Some application programs, for example, a word processor, may have a help tool that allows a user to enter a word or phrase and will display help topics containing that word or phrase, from which the user can make a selection.

SUMMARY OF THE DISCLOSURE

In one embodiment, a method of generating example queries includes receiving an actual query, and partitioning the actual query into one or more tokens. The method also includes generating one or more fragments of the actual query based on reassembly of the one or more tokens, and generating a plurality of example queries based on different interpretations of one or more fragments. The method further includes outputting at least one example query.

In another embodiment, a system for generating example queries comprises a parser to generate at least one token from an actual query received from a user, and a plurality of fragment generators to generate at least one fragment based on reassembly of the plurality of tokens. The system additionally comprises a plurality of example query generators to generate a plurality of example queries based on different interpretations of the at least one fragment and example query templates from a database.

In yet another embodiment, transmitting an actual query, wherein the query is in an imprecise syntax. The method also includes receiving at least one user interface mechanism to permit selection of one of at least one example query, the at least one example query having been dynamically generated in response to the actual query. Additionally, the method includes receiving a user input that corresponds to a selection of one example query, and transmitting an indication of the selected example query. Further, the method includes receiving query results in response to the selected example query.

DETAILED DESCRIPTION

Embodiments of systems and methods described herein generally relate to dynamically generating example user queries in response to an actual user query in a system designed for computation, search, or other activities involving the processing of queries. For example, dynamic generation of example user queries may be utilized in a system for parsing queries from users and generating answer outputs. In such a system, there may be instances in which the system cannot generate a satisfactory answer to a query. In such a situation, dynamic generation of example user queries may involve synthesizing example queries that are related to the initial user query and for which the system is able to generate satisfactory answers. In some embodiments, an algorithm may be utilized to semantically identify partial pieces of the query, and it may be determined what the system can compute based on a ranking those pieces.

Figure 1:
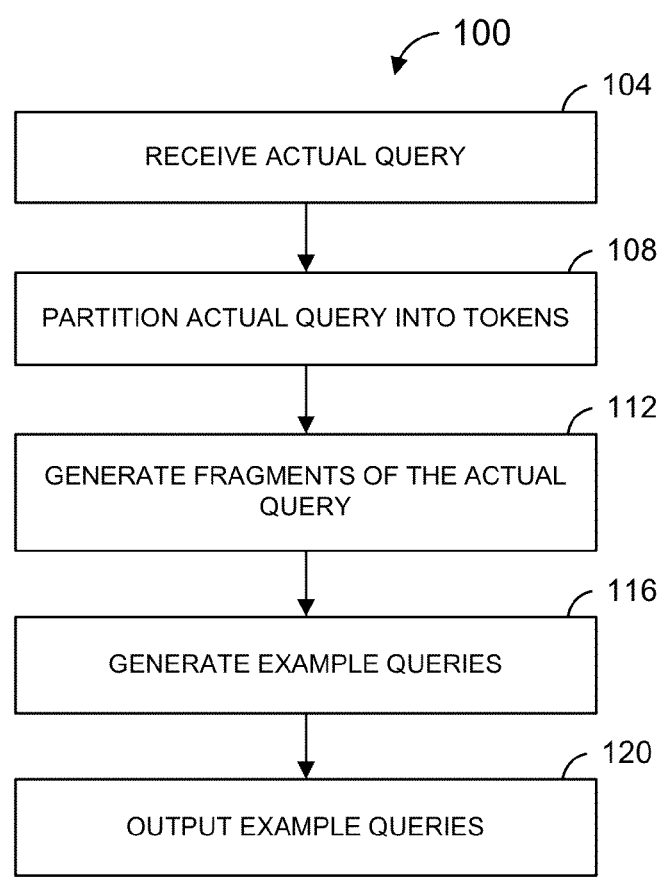
FIG. 1 is a flow diagram of an example method for dynamically generating example queries.

FIG. 1 is a flow diagram of an example method 100 for dynamically generating example queries in response to an actual query provided by a user. As will be described below, the method 100 may provide a user with example queries in response to an actual query that a system cannot generate a satisfactory answer to the actual query.

The method 100 could be implemented, at least partially, by a server system in conjunction with a website, for example. In this context, a user could access the website using a browser running on a personal computer, tablet computer, mobile phone, smart phone, personal digital assistant (PDA), etc., for example, and could utilize the website to obtain information. It will be understood, however, that the method 100 could also be used in other contexts. For example, the method 100 could be implemented, at least partially, as part of a "Help" system or other query-based system of a software application such as a computational tool. In such a context, the user could use the query-based system to obtain information.

At block 104, an actual query provided by a user may be received. For example, the actual query may be received via website, via a computational tool, via a software application executed on a computer, etc. In one embodiment, the query is a query in an imprecise syntax. A query in an imprecise syntax is in contrast to a typical computer programming language or database query syntax, in which exact spelling, exact placement of punctuation, exact placement of parentheses, etc., is necessary to specify a particular query or statement. Similarly, with typical computer programming language or database query syntax, a slight change in punctuation, for example, could specify a completely different query or statement, or could render a computer language or database query statement meaningless to a compiler or database. On the other hand, with a query in an imprecise syntax, the query can be expressed using language and terms that may be readily understandable to a human, but unintelligible to a computer program such as a compiler or database interface. Additionally, with a query in an imprecise syntax, many different variations of language and terms and groupings of language and terms may correspond to one query. Further, terms and groupings of terms in the query may be ambiguous, i.e., can have multiple meanings or senses.

At block 108, the actual query may be portioned into tokens. For example, sections of a string of input characters corresponding to the actual query may be demarcated into sections or tokens. For example, in a sentence or phrase, each word will may be a token, and each punctuation mark, if any, may also be a token. In a mathematical expression, for example, variables, numbers and symbols may be tokens.

At block 112, fragments of the actual query may be generated based on reassembling of the tokens generated at block 108. The fragments may comprise fragments deemed to be semantically meaningful. For example, a name of a country along with a recognized property of countries (e.g., population) may be deemed to be semantically meaningful. In one embodiment, determining whether a fragment is semantically meaningful may comprise determining if there is a recognized relationship between tokens. In general, determining whether a fragment is semantically may be implemented using a variety of techniques. The fragments need not comprise tokens that are adjacent in the actual query. For example, in the string "France goat population," one fragment may be "France population," because it is regarded as being semantically meaningful.

At block 116, example queries may be generated based on the fragments generated at block 112. For example, it may be determined whether fragments correspond to recognized query templates. One illustrative example of a template may be a country coupled with a country property. In one embodiment, a database of example generation templates may be included. In this embodiment, it may be determined if the fragments match with any of the templates. If a fragment matches with a template, an example query may be generated based on the fragment and the template. As an illustrative example, the fragment "France population" may be determined to match a template country/property. Thus, the example query "France population" may be generated.

In one embodiment, example template system may be configured to be very flexible and expansive so that, ideally, a wide variety of inputs can find matches in the database. In other embodiments, the example template system may be configured to be narrower and/or specialized, so that only certain categories of inputs find matches in the database.

In one embodiment, further processing can be performed when a fragment is determined to match an example template, and the example query can be processed in arbitrary ways according to specific instructions.

At block 120, at least some of the example queries generated at the block 116 may be output. Example queries may optionally be grouped according to categories, which may be derived from the example templates, for example. Block 120 may comprise generating a web page that includes indications of example queries. The web page may then be transmitted from a web site server system to the user's computer via the Internet, transmitting the web page from a computer to the user's computer via a network, etc. If other blocks of the method 100 are implemented using software executed by the user's computer, the example queries need not be transmitted via a network.

Figure 2:
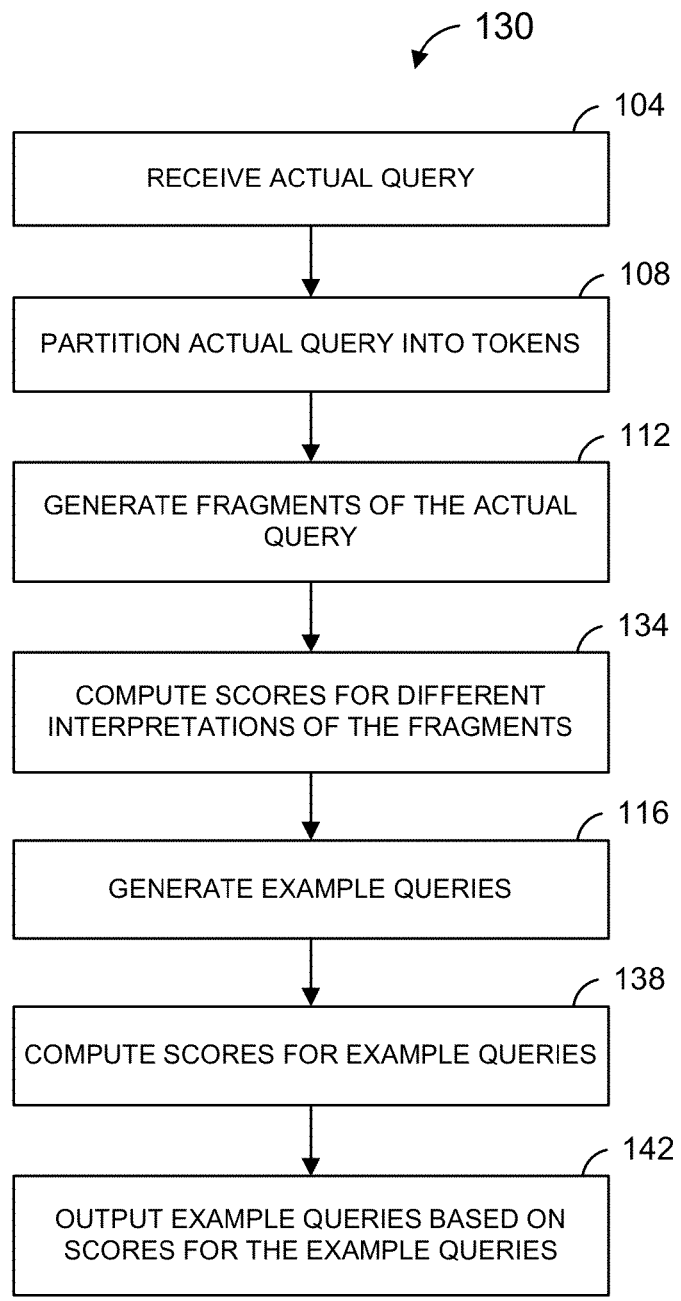
FIG. 2 is a flow diagram of another example method for dynamically generating example queries.

FIG. 2 is a flow diagram of another example method 130 for dynamically generating example queries in response to an actual query provided by a user. The method 130 includes blocks from the method 100 of FIG. 1. These blocks are like-numbered and will not be discussed.

At block 134, scores may be computed for different possible interpretations of each of the fragments. For a fragment "sun," different interpretations could comprise a day (Sunday), a star, a company (Sun Microsystems), etc. For the actual query "sun stock," a higher score may be given to an interpretation of "sun" as referring to a company, as compared to interpreting "sun" to refer to a day or to a star, for example.

At block 138, scores for each example query generated at block 116 may be computed. The scored computed at block 138 may be based on the scores generated at block 134, for example, along with other relevant information. In one embodiment, the percentage of the actual user query that was used to generate an example query may be used to compute the score for the example query. A higher percentage may lead to a higher score, for example. This may be especially useful for inputs such as mathematical expressions, in which it may be generally desirable to look for longer aggregate portions of an actual user query that is a polynomial or looks like an integration problem, for example.

At block 142, example queries are output based on the scored computed at block 138. For example, only example queries above a threshold score may be output. Also, the generated output may list or display the example queries in order based on their scores. Example queries may optionally be grouped according to categories, which may be derived from the example templates, for example.

Figure 3:
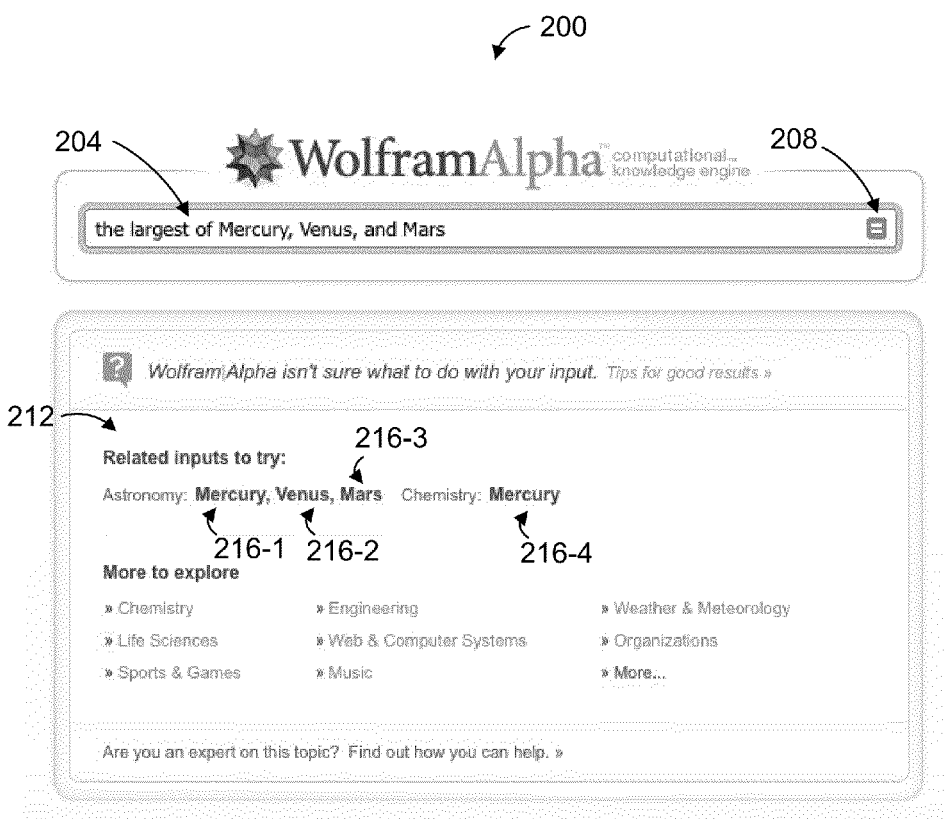
FIG. 3 is an illustration of an example display that may be utilized in an implementation of the method of FIG. 1 or the method of FIG. 2.

FIG. 3 is an illustration of an example display 200 that may be utilized in an implementation of a method such as the method 100 of FIG. 1 and/or the method 130 of FIG. 2.

The example display 200 is configured to permit a user to enter query. The display 200 may be part of a web page, window, etc., for example. In FIG. 3, a query has been entered: "the largest of Mercury, Venus, and Mars." The query has been entered into a text box 204 by a user, and then the user has activated a button 208. In response, several example queries have been generated and displayed in a portion 212 of the display 200. The example queries have been organized into categories. For example, under the category "Astronomy" the example queries "Mercury", "Venus" and "Mars" are displayed. Under the category "Chemistry" the example query "Mercury" is displayed. The example queries may provide links 216 that, when selected, cause the query to be submitted. For example, if the "Mercury" query 216-1 under the category "Astronomy" is selected, an astronomy-related "Mercury" query may be submitted. In an embodiment, the word "astronomy" may be included in the query or a suitable keyword that indicates the query is related to astronomy.

Figure 4:
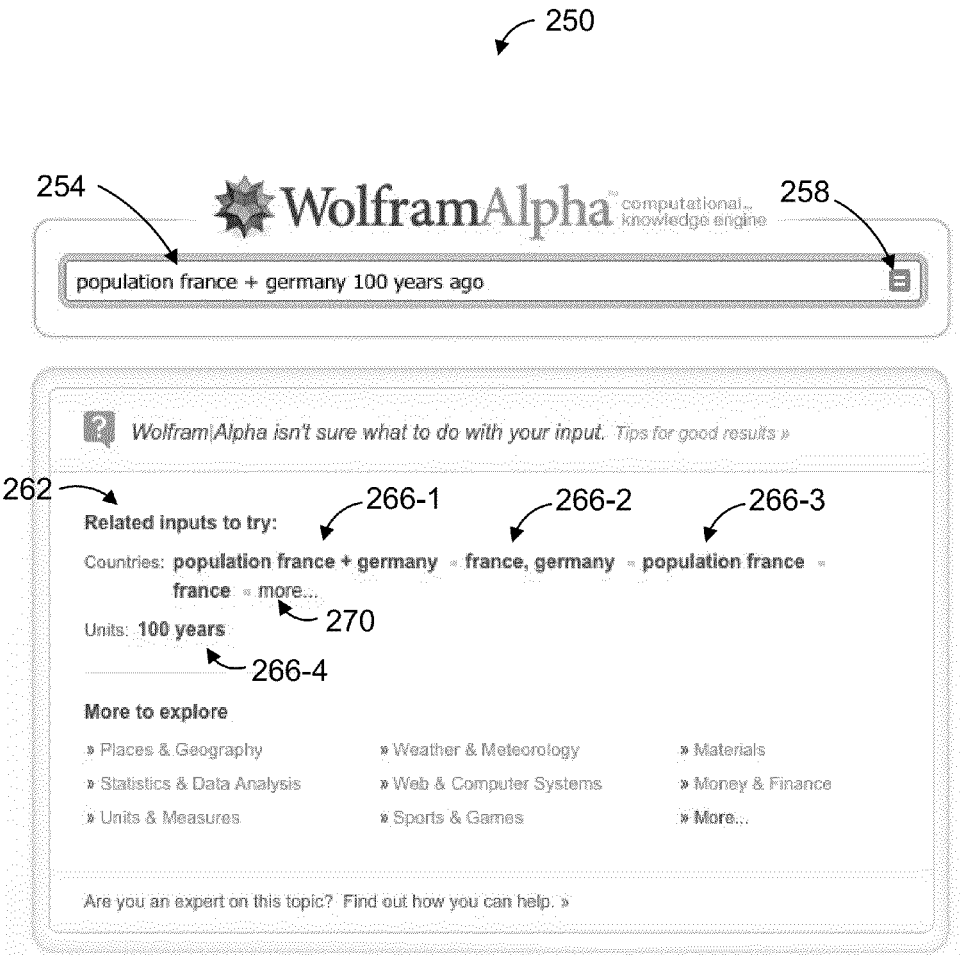
FIG. 4 is an illustration of another example display that may be utilized in an implementation of the method of FIG. 1 or the method of FIG. 2.

FIG. 4 is an illustration of an example display 250 that may be utilized in an implementation of a method such as the method 100 of FIG. 1 and/or the method 130 of FIG. 2. The example display 250 is configured to permit a user to enter query. The display 250 may be part of a web page, window, etc., for example. In FIG. 4, a query has been entered: "population france+germany 100 years ago." The query has been entered into a text box 254 by a user, and then the user has activated a button 258. In response, several example queries have been generated and displayed in a portion 262 of the display 250. The example queries have been organized into categories. For example, under the category "Countries" the example queries "population france+germany", "france, germany", "population france" and "france" are displayed. Under the category "Units" the example query "100 years" is displayed. The example queries may provide links 266 that, when selected, cause the query to be submitted. For example, if the "population france" query 266-3 under the category "Countries" is selected, a countries-related "population france" query may be submitted. In an embodiment, the word "country" may be included in the query or a suitable keyword that indicates the query is related to countries. The display 250 also includes a link "more" 270 that, when selected, may display more example queries.

Figure 5:
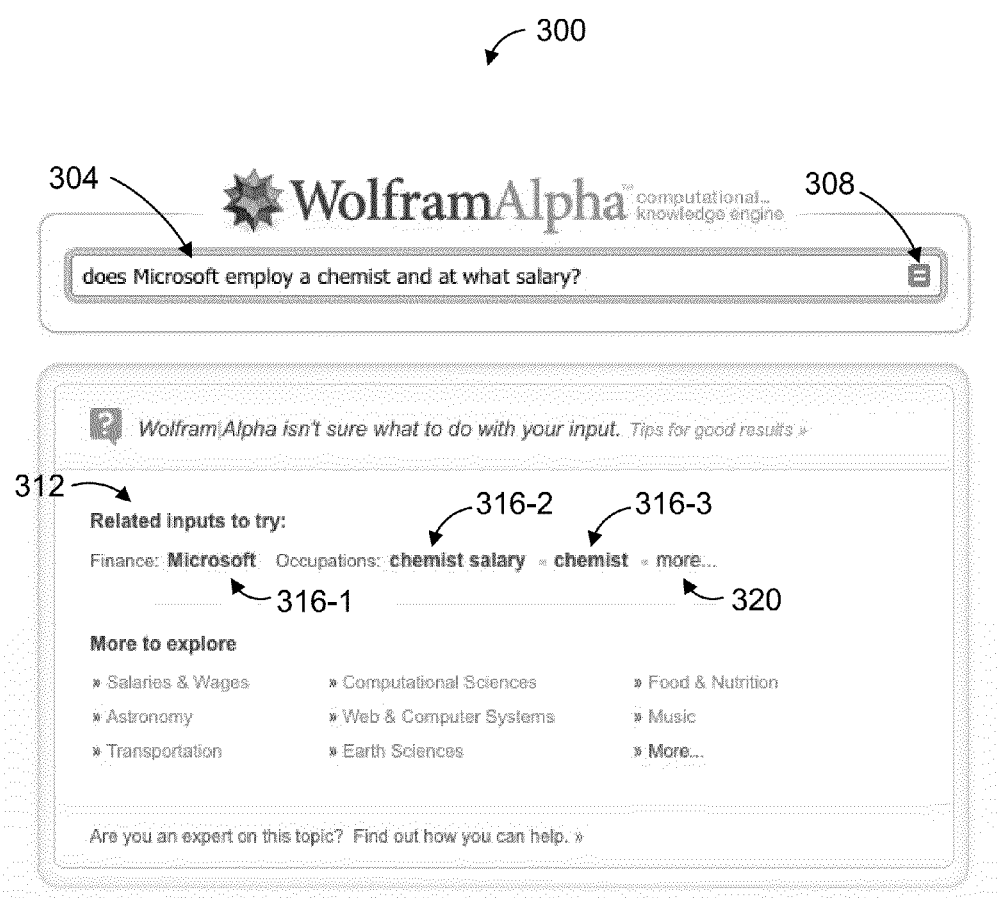
FIG. 5 is an illustration of another example display that may be utilized in an implementation of the method of FIG. 1 or the method of FIG. 2.

FIG. 5 is an illustration of an example display 300 that may be utilized in an implementation of a method such as the method 100 of FIG. 1 and/or the method 130 of FIG. 2. The example display 300 is configured to permit a user to enter query. The display 300 may be part of a web page, window, etc., for example. In FIG. 5, a query has been entered: "does Microsoft employ a chemist and at what salary?" The query has been entered into a text box 304 by a user, and then the user has activated a button 308. In response, several example queries have been generated and displayed in a portion 312 of the display 300. The example queries have been organized into categories. For example, under the category "Finance" the example query "Microsoft" is displayed. Under the category "Occupations" the example queries "chemist salary" and "chemist" are displayed. The example queries may provide links 316 that, when selected, cause the query to be submitted. For example, if the "chemist salary" query 316-2 under the category "Occupations" is selected, an occupation-related "chemist salary" query may be submitted. In an embodiment, the word "occupation" may be included in the query or a suitable keyword that indicates the query is related to occupations. The display 300 also includes a link "more" 320 that, when selected, may display more example queries.

Figure 6:
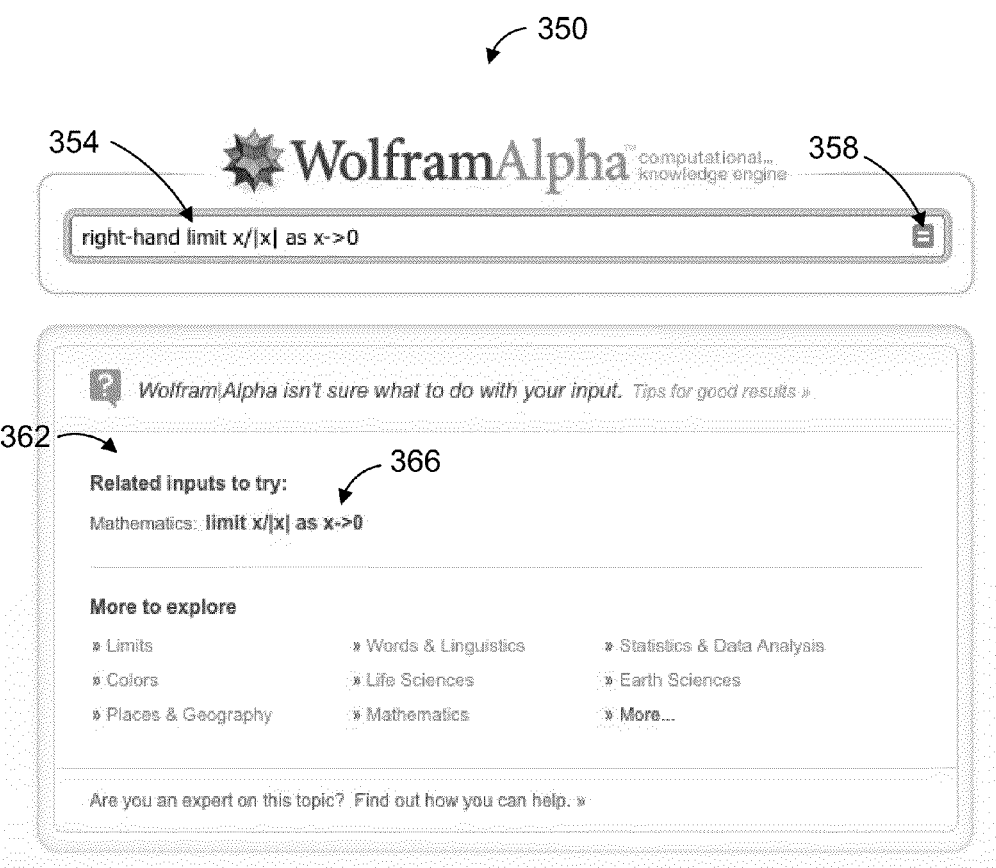
FIG. 6 is an illustration of another example display that may be utilized in an implementation of the method of FIG. 1 or the method of FIG. 2.

FIG. 6 is an illustration of an example display 350 that may be utilized in an implementation of a method such as the method 100 of FIG. 1 and/or the method 130 of FIG. 2. The example display 300 is configured to permit a user to enter query. The display 350 may be part of a web page, window, etc., for example. In FIG. 6, a query has been entered: "right-hand limit x/|x| as x->0". The query has been entered into a text box 354 by a user, and then the user has activated a button 358. In response, one example query has been generated and displayed in a portion 362 of the display 350: "limit x|x| as x->0". The example query may provide a link 366 that, when selected, causes the query to be submitted. In an embodiment, the word "mathematics" may be included in the query or a suitable keyword that indicates the query is related to mathematics.

Figure 7:
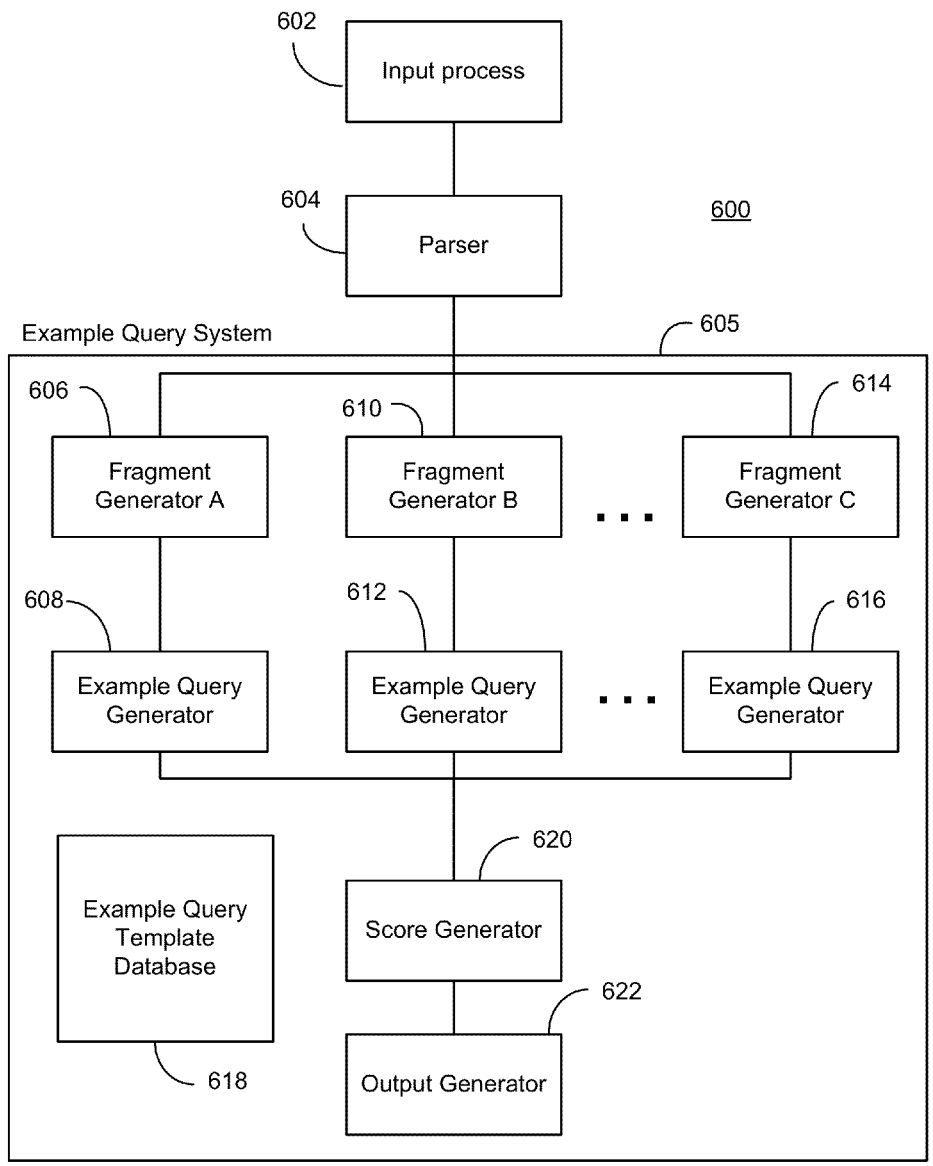
FIG. 7 is a block diagram of an example system for dynamically generating example queries.

FIG. 7 is a block diagram of an embodiment of an example query generating system 600 that may be used to implement one or more of the example methods described previously. Of course other systems may also be used to implement those methods. The system 600 may include an input process 602 for receiving a query such as from a user.

The system 600 may be implemented in a server (e.g., a web server), so that users may submit queries via the Internet, for example, or via some other network such as a local area network (LAN), a wide area network (WAN), etc. Also, the system 600 may be a stand-alone executable application with its own user interface. Also, the system 600 could be an added feature or subsystem of a larger application such as a computational application (e.g., the MATHEMATICA® software system available from Wolfram Research, Inc., a spreadsheet application, etc.). For example, the system 600 could be part of a "help" subsystem or some other query-based system within a larger application. Additionally, the system 600 could be an applet accessed via a website, for example. Further, the system 600 may also be implemented as a Web service with a Web browser implementing the user interface in a known manner. For example, the system 600 could be browser plug-in or toolbar system. The input process 602 may also provide elementary error and consistency checking, for example, to help ensure that at least some characters are present or prompting the user with an error when a length limit is exceeded.

The system 600 may also include a parser 604 communicatively coupled to the input process 602. The parser 604 may examine the input to extract keywords, group words into phrases, identify numerical expressions, categorize data, etc., for example. The output of the parser 604 may be referred to as tokens. The parser 604 may perform an initial go/no go analysis on the keywords, phrases, or numerical expressions to determine if there is enough information to proceed to a further step. When there is not enough information to make even a cursory pass at further analysis, the parser 604 may cause the user to be prompted for additional information such as information that may clarify the query desired by the user. Alternatively, the system 600 may return the input unchanged along with a message that it cannot interpret the input.

The one or more tokens generated by the parser 604 may be provided to an example query system 605 that includes one or more fragment generators 606, 610, and 614 that may each have a particular focus. Each fragment generator 606, 610, and 614 generally identifies fragments of the initial query that it deems to be semantically meaningful. In one embodiment, each fragment generator 606, 610, and 614 determines whether a fragment is semantically meaningful by determining if there is a recognized relationship between tokens.

The fragment generators 606, 610, and 614 may each have a particular focus. For example, fragment generator A 606 may be directed to science, the fragment generator B 610 may be directed to Finance, and the fragment generator C 614 may be directed to Geography. As an example, if an input includes an expression, such as "sun", fragment generator A 606 may generate fragments related to the star, and the fragment generator B 610 may generate fragments related to the company Sun Microsystems. Other fragments generators may have other specific specializations, such as, mathematical formulas, chemical formulas, physics formulas, financial formulas, engineering formulas, medical formulas, etc.

Depending upon the application, more or less fragments generators may be utilized. For instance, if an application is to be devoted for use in a financial field, fragments generators related to chemical formulas may be omitted.

Each fragment generator may attempt to identify phrases. Additionally, each fragment generator may attempt to rearrange tokens to see if the rearrangements are related in a way that the fragment generator understands. For instance, a fragment generator may utilize algorithmic rearrangements of the input.

The fragment generators 606, 610, 614 also may compute scores for different possible interpretations of each of the fragments. For a fragment "sun," different interpretations could comprise a day (Sunday), a star, a company (Sun Microsystems), etc. For the actual query "sun stock," a higher score may be given to an interpretation of "sun" as referring to a company, as compared to interpreting "sun" to refer to a day or to a star, for example.

In one embodiment, the fragment generators 606, 610, 614 may comprise one or more primary fragment generators and one or more secondary fragment generators. For example, outputs of the one or more primary fragment generators may be provided as inputs to the one or more secondary fragment generators.

Fragments generated by the fragment generators may be provided to a plurality of example query generators 608, 612, 616. The plurality of example query generators 608, 612, 616 may determine whether fragments correspond to recognized query templates, for example. One illustrative example of a template may be a country coupled with a country property. In one embodiment, a database 618 of example generation templates may be included. In this embodiment, the plurality of example query generators 608, 612, 616 may determined if the fragments match with any of the templates stored in the database 618. If a fragment matches with a template, an example query may be generated based on the fragment and the template. As an illustrative example, the fragment "France population" may be determined to match a template country/property. Thus, the example query "France population" may be generated.

In one embodiment, the example template system may be configured to be very flexible and expansive so that, ideally, a wide variety of inputs can find matches in the database. In other embodiments, the example template system may be configured to be narrower and/or specialized, so that only certain categories of inputs find matches in the database 618.

Each of the plurality of example query generators 608, 612, 616 may have a particular focus. For example, the example query generator 608 may be directed to science, the example query generator 612 may be directed to Finance, and the example query generator 616 may be directed to Geography. Other example query generators may have other specific specializations, such as, mathematical formulas, chemical formulas, physics formulas, financial formulas, engineering formulas, medical formulas, etc.

A score generator 620 may generate scores for each example query generated. The scores generated by the generator 620 may be based on the scores generated by the fragment generators 606, 610, 614, for example, along with other relevant information. In one embodiment, the percentage of the actual user query that was used to generate an example query may be used to compute the score for the example query. A higher percentage may lead to a higher score, for example. This may be especially useful for inputs such as mathematical expressions, in which it may be generally desirable to look for longer aggregate portions of an actual user query that is a polynomial or looks like an integration problem, for example.

The example queries and scores may be provided to an output generator 622 that may generate an output having the example queries with rankings above a certain threshold, while omitting results below the threshold, in one embodiment. In this embodiment, the threshold may be set at a predetermined level, or may be adjusted according to the number of example queries and a statistical analysis of the scores. For example, an actual query that results in ten thousand example queries may adjust the threshold to a 99% relevance, thereby limiting the displayed example queries to the top 100. In another example though, where perhaps only a half a dozen example queries are returned, all the example queries may be displayed even though the scores may be relatively low. The output of the output generator 622 may comprise a web page, a window, etc., having one or more example queries with links that, when selected, cause the example query to be submitted. Examples of web pages, windows, etc., that the output module 518 may generate are shown in FIGS. 3-6.

Particularly in a Web Services or comparable environment, fragment generators and example query generators may be added or reconfigured based on user needs. Similarly, the database 618 may be updated over time and/or based on user needs. For instance, feedback from users or an analysis of user queries may be utilized to add a fragment generator and example query generator devoted to a new field (e.g., electrical engineering) or to add further templates to the database 618. Similarly, fragment generators, example query generators, and example templates may be omitted or removed.

In one embodiment, the method 100, the method 130, and/or the system 600 may be incorporated into a system such as the example systems described U.S. patent application Ser. No. 11/852,044, filed on Sep. 7, 2007, and entitled "Methods and Systems for Determining and Processing Formulas," which is hereby expressly incorporated by reference herein.

Referring now to FIG. 7 of the present application and FIG. 11 of U.S. patent application Ser. No. 11/852,044, the input process 602 (present application, FIG. 7) may be incorporated into the input process 502 (U.S. Pat. App. 11/852,044, FIG. 11), for example. Similarly, the parser 604 (present application, FIG. 7) may be incorporated into the parser 504 (U.S. Pat. App. 11/852,044, FIG. 11), for example. Also, at least some of the functionality of the fragment generators 606, 610, 614 (present application, FIG. 7) may be incorporated into the parser 504 (U.S. Pat. App. 11/852,044, FIG. 11), for example. For instance, primary fragment generation may be incorporated in the parser 504 (U.S. Pat. App. 11/852,044, FIG. 11), whereas secondary fragment generation may be implemented outside of the parser 504. Other blocks of FIG. 7 of the present application may be added to the system 500 in FIG. 11 of U.S. Pat. App. 11/852,044 and/or incorporated into blocks in FIG. 11 of U.S. Pat. App. 11/852,044.

Figure 8:
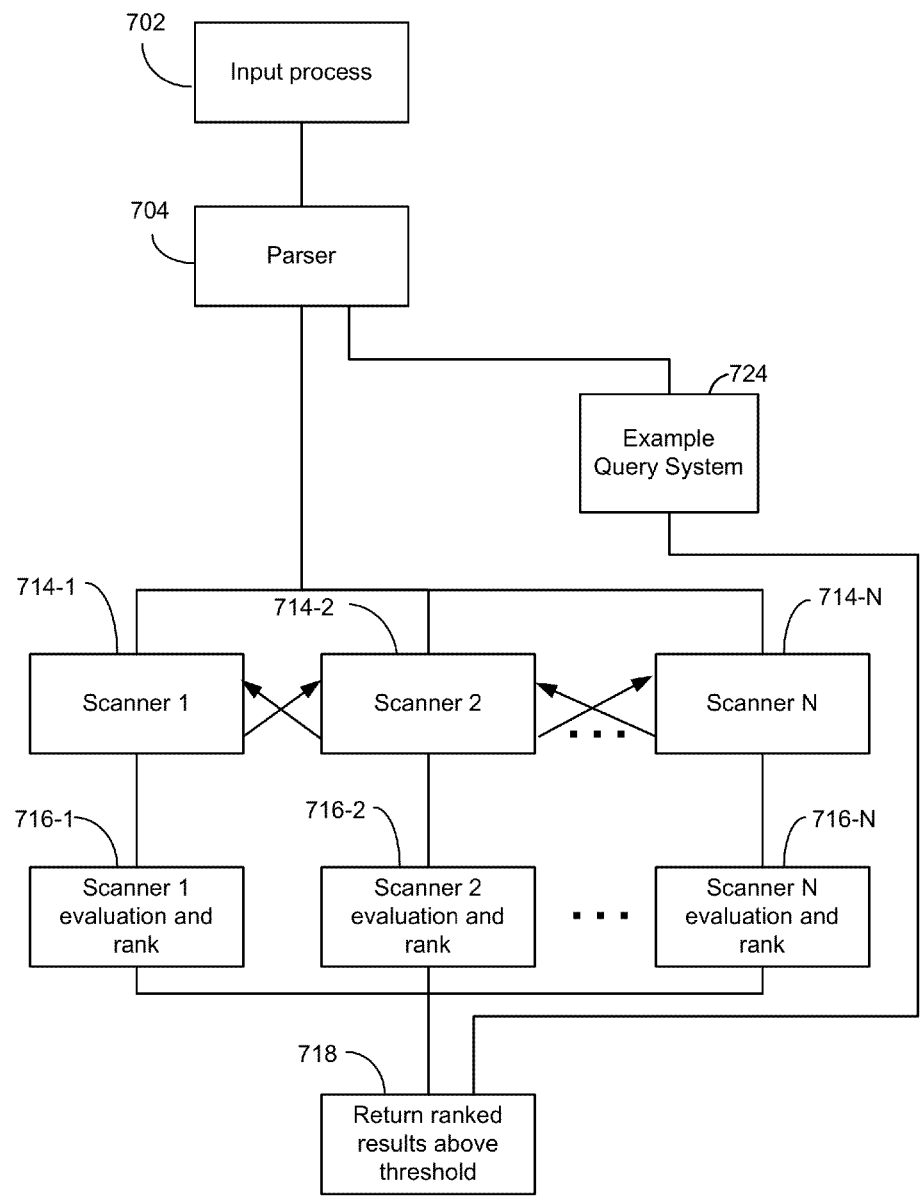
FIG. 8 is a block diagram of an example system for dynamically generating answers to queries in an imprecise syntax.

Referring now to FIG. 8 of the present application, a block diagram illustrates an example system 700 that may be used to implement one or more of the example methods described previously. Of course other systems may also be used to implement those methods. The system 700 may be a stand-alone executable application with its own user interface. Also, the system 700 could be an added feature or subsystem of a larger application such as a computational application (e.g., the MATHEMATICA® software system available from Wolfram Research, Inc., a spreadsheet application, etc.). For example, the system 700 could be part of a "help" subsystem within a larger application. Additionally, the system 700 could be an applet accessed via a website, for example. Further, the system 700 may also be implemented as a Web service with a Web browser implementing the user interface in a known manner. For example, the system 700 could be browser plug-in or toolbar system. The system 700 may include an input process 702 for receiving data from a user. The input process 702 may receive input in an imprecise syntax. The input process 702 may also provide elementary error and consistency checking, for example, to help ensure that at least some characters are present or prompting the user with an error when a length limit is exceeded. The input process 702 may include the input process 602 of FIG. 7.

The system 700 may also include a parser 704 communicatively coupled to the input process 702. The parser 704 may examine the input to extract keywords, group words into phrases, identify numerical expressions, categorize data, etc., for example. The parser 704 may perform an initial go/no go analysis on the keywords, phrases, or numerical expressions to determine if there is enough information to proceed to a further step. When there is not enough information to make even a cursory pass at further analysis, the parser 704 may cause the user to be prompted for additional information such as information that may clarify the formula desired by the user. Alternatively, the system 700 may return the input unchanged along with a message that it cannot interpret the input.

In one implementation, the parser 704 may take an initial input and create tokens, and then assemble the tokens into one or more expressions in a precise syntax. In other words, the parser 704 may generally take input data in an imprecise syntax and generate expressions in a precise syntax. As an example, if a user enters the text "sin[x]<0.5", the parser 704 may create a plurality of tokens: "sin", "[x]", "<", and "0.5", where "sin" is recognized as a function name, "[x]" is recognized as a variable name, "<" is recognized as an inequality, and "0.5" is recognized as a real number. Then, the parser 704 may generate an expression in a precise syntax using these tokens.

Optionally, the parser 704 may perform additional processing. For example, the parser may attempt to identify phrases. Additionally, the parser 704 may attempt to rearrange tokens to see if the rearrangements match something that the parser 704 understands, such as a phrase. For instance, the parser 704 may utilize algorithmic rearrangements of the input. Also, the parser 704 may cause the user to be prompted to rephrase the input. Then, the parser 704 may analyze the original input in conjunction with the rephrased input. Further, the parser 704 may utilize machine learning techniques to identify language processing algorithms that work better than others.

The parser 704 may include the parser 604 of FIG. 7. In some embodiments, the parser 704 also includes at least some of the functionality of the fragment generators 606, 610, 614 of FIG. 7. In one embodiment, primary fragment generation is implemented in the parser 504.

The one or more expressions generated by the parser 704 may be provided to one or more scanners 714 that may each have a particular focus. For example, scanner 714-1 may be directed to developing a graphical plot for numerical expressions or phrases parsed from the input that can be reduced to a plot. As an example, if an input includes an expression, such as $x^2$, scanner 714-1 may develop and output a plot of $x^2$ (i.e., a parabola). As another example, if the expression is Sin[x] <0.5, scanner 714-1 may develop and output a plot of values of x that satisfy this expression. Other scanners 714 may have other specific specializations, such as evaluating equations, determining roots, evaluating integrals, evaluating derivatives, determining relevant transforms, etc. Other specializations may include, for example, determining mathematical formulas, determining chemical formulas, determining physics formulas, determining financial formulas, determining engineering formulas, determining medical formulas, etc.

Depending upon the application, more or less scanners 714 may be utilized. For instance, if an application is to be devoted for use in a financial field, scanners related to chemical formulas may be omitted.

Some scanners 714 may generate results based on a database query. For example, a scanner 714 related to geometry formulas may query a database for keywords "area" and "triangle" for formulas related to those terms. As another example, a scanner 714 may query a database for raw data needed to evaluate an expression. For instance, an expression may include c, the speed of light, and a scanner may query a database to retrieve a numerical value for c. As another example, an expression may require statistical data, such as a population of a particular city, state, or country needed to evaluate a "per capita" expression, and the scanner 714 may query a database to obtain the needed data.

Other scanners 714 may generate results by synthesizing outputs. For example, a scanner 714 for generating indefinite integrals may receive a mathematical expression and synthesize the indefinite integral of that expression, rather than searching a database of pre-generated indefinite integrals. Some scanners 714 may be capable of doing database queries as well as synthesis of results. For example, the scanner 714 related to geometry formulas may generate an expression for the area of a triangle based on a database query, but may also synthesize another expression by integrating parameter values into formulas retrieved from a database.

In addition to receiving data from the parser 704, each scanner 714 may share results with each of the other scanners. Again, results generated by a scanner 714 based on the shared results may also be shared with each of the other scanners 714, and so on. This process may continue until the scanners 714 no longer have additional data to add, for example. Trivial transforms may also be recognized and blocked.

When each scanner 714 has contributed to both the original input from the parser 704 and shared input from all the other scanners 714, the results from each scanner to respective postprocessors 716. The postprocessors 716 evaluate the results and may provide a ranking of each result by assigning a value (e.g., a percentage) to each result.

The ranked results may be passed to an output module 718 which may generate an output having the results with rankings above a certain threshold, while omitting results below the threshold. The threshold may be set at a predetermined level, or may be adjusted according to the number of results and a statistical analysis of the rankings. For example, a query that produces ten thousand results may adjust the threshold to 99% relevance, thereby limiting the displayed results to the top 100. In another example though, where perhaps only a half a dozen results are returned, all the results may be displayed even though the rankings may be relatively low. The output of the output module 718 may comprise a web page, a window, etc.

The system 700 also includes an example query system 724 coupled to the parser 704. Some or all of the one or more expressions generated by the parser 704 are provided to the example query system 724. The example query system 724 may include some or all of the components of the example query system 605 of FIG. 7. For example, in some embodiments, primary fragment generation performed by the fragment generators 606, 610, 614 is incorporated in the parser 704, whereas secondary fragment generation is implemented by the example query system 724. As another example, the example query system 724 includes the score generator 620 and the output generator 622 of FIG. 7, in one embodiment. In other embodiments, some or all of the score generator 620 and/or the output generator 622 are included in the output module 718. If the output generator 622 is included in the output module 718, examples of web pages, windows, etc., that the output module 718 may generate are shown in FIGS. 3-6. Referring to FIGS. 3-6, links or other user interface mechanisms (e.g., buttons, pull-down menus, etc.), can be provided to permit a user to select an example query dynamically generated by the system 700 in order to generate at least potentially different results.

Figure 9:
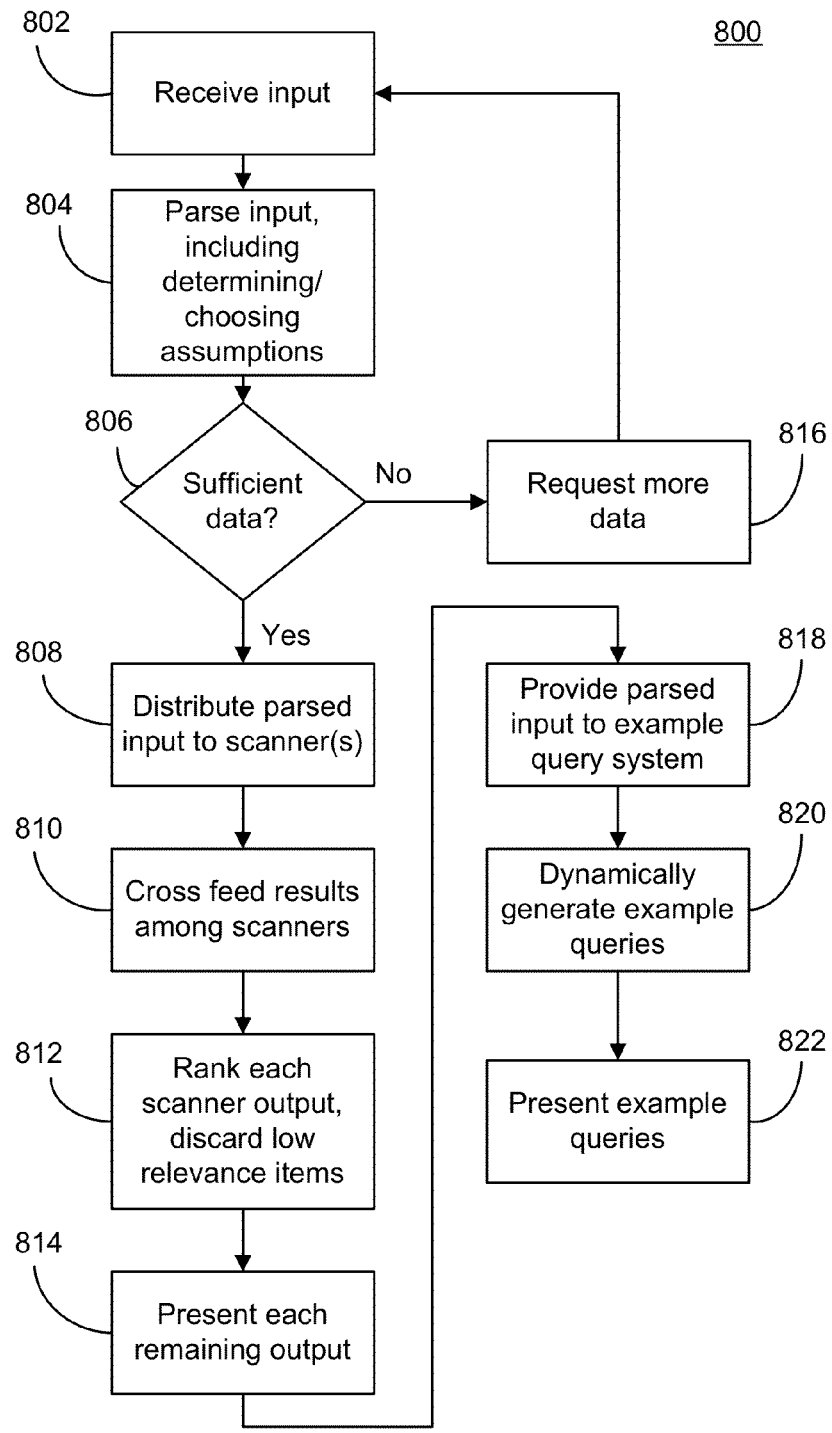
FIG. 9 is a flow diagram of an example method for dynamically generating answers to queries in an imprecise syntax.

FIG. 9 is flow diagram of an example method 800 for providing one or more answers to a user based on a query input that may be in an imprecise syntax. The method 800 will be described with reference to FIG. 8 for ease of explanation. It will be understood, however, that the method 800 may be utilized with systems other than the system 700, and that the system 700 may implement methods other than the method 800.

Input in an imprecise syntax may be received at block 802 and then parsed at block 804 to process the input. For example, the input may be analyzed to create data in a formal or precise syntax. When the parser 704 is able to determine a sufficient amount of data to proceed, a 'yes' branch from a block 806 maybe taken to a block 808. At the block 808, the parsed data (e.g., the output of the parser 704) may be distributed to each of the plurality of scanners 714. As described above, each scanner 714 may examine the output of the parser 704 at the block 808 for areas of specific capability with respect to that scanner 714. When a scanner 714 identifies data it can process, the scanner creates output specific to the input and then, at a block 810, the scanner 714 may share its output with each of the other scanners 714. For example, the scanner 714-1 may create a mathematical expression and that mathematical expression may be delivered to scanners 714-2 and 714-N. Scanners 714-2 and 714-N may be able to synthesize output based on the mathematical expression from scanner 714-1 that they were not able to process from the direct input from the parser 704.

When each scanner 714 can no longer synthesize meaningful output, the results may be passed to the output module 718 at a block 812. At the block 812, each output may be ranked in terms of relevance. Output elements of low relevance optionally may be discarded. At a block 814, output elements that were not discarded at the block 812 may be presented to the user. Output elements may be presented in rank order, or in the case of more common output elements, in a standard presentation format.

When the parser 704 cannot process the input, the 'no' branch from the block 806 may be taken to block 816 and the user may be prompted for more information. Alternatively, the user may be prompted that the input cannot be interpreted and the flow may return to the block 802 to receive a next input.

At block 818, at least some of the parsed data generated by the parser 704 is provided to the example query system 724. At block 820, the example query system 724 dynamically generates one or more example queries based on the data from the parser 704. In some embodiments, the example query system 724 implements some of example method 100 (FIG. 1) and/or some of example method 200 (FIG. 2). At block 822, at least some of they dynamically generated example queries are presented to the user. Examples of web pages, windows, etc., that present example queries are shown in FIGS. 3-6.

In some embodiments, results from block 812 and example queries from block 820 are presented together in, for example, a web page, a window, etc. In some embodiments, at least some of the blocks 818, 820 are implemented in parallel with the blocks 808, 810, 812. In some embodiments, example queries are presented even if the system 700 cannot generate relevant results at block 812. In one embodiment, the blocks 818, 820, 822 are performed when, at block 806, it is determined that there is not sufficient data.

Figure 10:
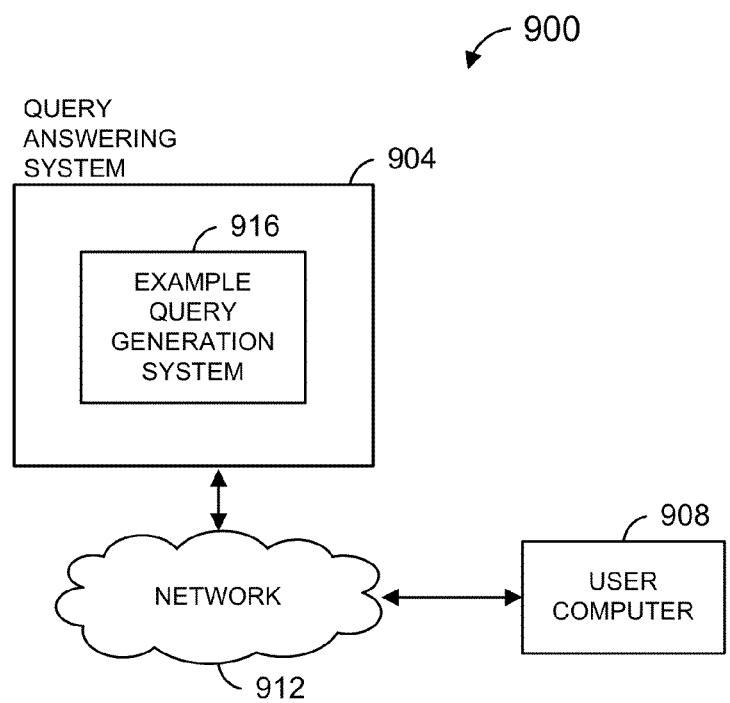
FIG. 10 is a block diagram of an example system for answering queries in an imprecise syntax.

FIG. 10 is block diagram of an example system 900 that includes a query answering system 904 for answering queries in imprecise syntax. The query answering system 904 generates answers to queries as opposed to merely providing links to web pages having words that match words in the query. In other words, the query answering system 904 attempts to understand the meaning of the query and then provides an answer to the query based on the understood meaning.

The system 900 includes a user computer 908 coupled to the query answering system 904 via a communications network 912. The communications network 912 may include a local area network (LAN), a wireless LAN, a wide area network (WAN), a mobile communications network, the Internet, etc.

A user enters a query via the user computer 908. For example, the user may enter a query via a web page or other display that is displayed on a display device of the user computer 908. The user computer 908 then transmits the query to the query answering system 904 via the network. The query answering 904 includes an example query generation system 916 that dynamically generates example queries based on the query entered by the user. In an embodiment, the query answering system 904 is implemented on a computer such as a server, a workstation, a mainframe, etc. The query answering system 904 may be a system such as the system 700 of FIG. 8 or another suitable system. The example query generating system 916 may include the system 605 of FIG. 7, the system 724 of FIG. 8, or another suitable system. The user computer 908, in various embodiments, is a personal computer, a tablet computer, a smart phone, a personal digital assistant (PDA). Each of the device 904 and the device 908 include respective network interfaces to transmit and receive data via the network 912.

When the answering system 904 is able to generate an answer to the query, the answer is transmitted by the answering system 904 via the network 912. The answer may be included in a web page or other suitable display, which is displayed on the display device of the user computer 908. In an embodiment, the answering system 904 also transmits indications of example queries generated by the system 916, and transmits these indications via the network 912. In an embodiment, the answering system 904 transmits indications of example queries generated by the system 916 even when the system 904 is unable to generate an answer to a query, and transmits these indications of example queries via the network 912. The indications of the example queries are displayed on the display device of the user computer 908. Such displays may include user interface mechanisms (e.g., links, buttons, pull-down menus, etc.) to permit a user to select an example query using the user computer 908. If the user selects an example query, an indication of the selection is transmitted by the user computer 908 to the answering system 904 via the network. In response to receiving the indication of the selection, the answering system 904 determines an answer to the selected query, and the answer is transmitted to the user computer 908 for display to the user.

In an embodiment, the answering system 904 implements the method 100 of FIG. 1. For example, at least the block 116 is implemented by the example query generation system 916, according to an embodiment. In another embodiment, the answering system 904 implements the method 130 of FIG. 2. For example, at least the blocks 116 and 138 are implemented by the example query generation system 916, according to an embodiment. The answering system 904 may generate web pages or displays similar to the example displays of FIGS. 3-6.

In an embodiment, the answering system 904 receives a query in an imprecise syntax from the user computer 908, via the network 912, the query including a word, phrase, or group of textual characters. The answering system 904 generates an answer to the query. Additionally or even when the answering system 904 is unable to generate an answer to the query, the answering system generates one or more example queries. The answering system 904 provides a user interface mechanism to permit a user to select an example query. For example, in an embodiment, the answering system 904 provides web pages or windows similar to the example displays of FIGS. 3-6 to the user computer 908. The answering system 904 receives, from the user computer 908 via the network 912, an indication of a selected example query selected by the user using the user interface mechanism. The answering system 904 generates an answer to the selected example query, and transmits, to the user computer 908 via the network 912, an indication of the answer to the selected query.

In an embodiment, the user computer 908 transmits, via the network 912, a query in an imprecise syntax, the query including a word having multiple meanings or senses. In response, the user computer 908 receives from the answering system 904, via the network 912, indications of example queries dynamically generated in response to the query. Also, the user computer 908 receives from the answering system 904, via the network 912, a user interface mechanism to permit selection of an example query. The user computer 908 displays query results (if provided), the indication of the example queries, and the user interface mechanism to permit selection of an example query on the display device of the user computer 908. For example, in an embodiment, the user computer 908 displays web pages or windows similar to the example displays of FIGS. 3-6, on a display device of the user computer 908.

Any of the techniques described above, including the blocks described with reference to FIGS. 1-10, may be implemented using a processor that executes machine readable software or firmware instructions. Such computer program instructions may control the operation of a computing device such as a desktop computer, a laptop computer, a tablet computer, a workstation, a server, a mainframe, a mobile phone (e.g., a smart phone), a telephone, a set top box, a PDA, a pager, a processing system of an electronic toy, a processing system of an electronic game, a processing system of a consumer electronics device, etc. The computing device may have a processor and a memory in which the computer program instructions may be stored. The processor is coupled to the memory and executes the computer program instructions. The computer program instructions may be written in any high level language such as the programming language used with MATHEMATICA® software systems, C, C++, C#, Java or the like or any low-level assembly or machine language. By storing computer program instructions in a memory of the computing device, the computing device is physically and/or structurally configured in accordance with the computer program instructions.

While many methods and systems have been described herein as being implemented using a processor executing machine readable instructions, they may be implemented at least partially in hardware, and may be implemented by a variety of computing systems and devices. Thus, the method blocks and system blocks described herein may be implemented in a standard multi-purpose central processing unit (CPU), a special purpose CPU, or on specifically designed hardware such as an application-specific integrated circuit (ASIC) or other hard-wired device as desired. When implemented using a processor executing machine readable instructions, the machine readable instructions may be stored in any computer readable memory such as on a magnetic disk, a laser disk (such as a compact disk (CD), a digital versatile disk (DVD)), a flash memory, a memory card, a memory stick, etc., or other storage medium, in a RAM or ROM of a computer or processor, in any database, etc. Likewise, the machine readable instructions may be delivered via any known or desired delivery method including, for example, on a computer readable memory or other transportable computer storage mechanism or over a communication channel such as a telephone line, the internet, etc. (which are viewed as being the same as or interchangeable with providing such software via a transportable storage medium).

The present disclosure has been described with reference to specific examples, which are intended to be illustrative only and not to be limiting. It will be apparent to those of ordinary skill in the art that changes, additions or deletions may be made to the disclosed examples without departing from the spirit and scope of the disclosure. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of this application.

Thus, many modifications and variations may be made in the techniques and systems described and illustrated herein without departing from the spirit and scope of the present invention. Accordingly, it should be understood that the methods and systems described herein are illustrative only and are not limiting upon the scope of the invention.

What is claimed is:

1. A method of generating example natural language queries, comprising:

receiving an actual natural language query from a user;

partitioning the actual natural language query into one or more tokens;

generating one or more expressions in a precise syntax using the one or more tokens;

processing the one or more expressions in an attempt to generate an answer to the natural language query;

generating one or more fragments of the actual natural language query based on reassembly of the one or more tokens, wherein at least one of the one or more fragments has multiple portions comprising the one or more tokens;

generating a plurality of example natural language queries based on (i) different interpretations of the one or more fragments, and (ii) a plurality of query templates for comparing to the one or more fragments, wherein at least some of the plurality of query templates comprise pairs of (i) known categories and (ii) known properties respectively associated with the categories, and wherein generating the plurality of example natural language queries includes:
  determining, for each fragment having multiple portions, whether a first portion of the fragment matches a first category corresponding to a first one of the plurality of query templates and a second portion of the fragment matches a first property corresponding to the first one of the plurality of query templates, the first property associated with the first category, and
  when it is determined that the first portion of the fragment matches the first category corresponding to the first one of the plurality of query templates and the second portion of the fragment matches the first property corresponding to the first one of the plurality of query templates, generating one of the plurality of example natural language queries based on the first one of the plurality of query templates; and
transmitting to the user, via a network, the at least one of the plurality of example natural language queries.

2. A method according to claim 1, further comprising:
computing scores for the plurality of example natural language queries; and
determining which one or more example natural language queries in the plurality of example natural language queries are to be transmitted based on the scores for the plurality of example natural language queries.

3. A method according to claim 2, further comprising:
computing scores for the different interpretations of the one or more fragments;
wherein computing scores for the plurality of example natural language queries is based on the scores for the different interpretations of the one or more fragments.

4. A method according to claim 2, wherein computing scores for the plurality of example natural language queries is based on respective percentages of the one or more tokens utilized in generating respective example natural language queries.

5. A method according to claim 1, wherein generating the plurality of example natural language queries is further based on a database of example query templates.

6. A method according to claim 1, wherein transmitting at least one of the plurality of example natural language queries comprises transmitting a web page via the network, wherein the web page includes an indication or indications of the at least one of the plurality of example natural language queries.

7. A method according to claim 6, wherein transmitting at least one of the plurality of example natural language queries comprises providing at least one user interface mechanism to permit the user to select one example natural language query of the at least one of the plurality of example natural language queries.

8. A method according to claim 7, wherein the at least one user interface mechanism provides the indication or indications of the at least one of the plurality of example natural language queries.

9. A system for generating example natural language queries, the system comprising a plurality of modules embodied as blocks in a hardware processor, the modules comprising:
  a parser module to generate one or more tokens from an actual natural language query received from a user;
  a plurality of fragment generator modules to generate at least one fragment of the actual natural language query based on reassembly of the one or more tokens, wherein at least one of the one or more fragments has multiple portions comprising the one or more tokens; and
  a plurality of example natural language query generator modules to generate a plurality of example natural language queries based on (i) different interpretations of the at least one fragment, and (ii) a plurality of query templates for comparing to the at least one fragment, the query templates retrieved from a database, wherein at least some of the plurality of query templates comprise pairs of (i) known categories and (ii) known properties respectively associated with the categories, and wherein the plurality of example natural language query generator modules generate the plurality of example natural language queries by:
    determining, for each fragment having multiple portions, whether a first portion of the fragment matches a first category corresponding to a first one of the example query templates and a second portion of the fragment matches a first property corresponding to the first one of the example query templates, the first property associated with the first category, and
    when it is determined that the first portion of the fragment matches the first category corresponding to the first one of the plurality of query templates and the second portion of the fragment matches the first property corresponding to the first one of the plurality of query templates, generating one of the plurality of example natural language queries based on the first one of the plurality of query templates.

10. A system according to claim 9, further comprising:
a first score generator module to generate scores for the plurality of example natural language queries; and
an output generator module to selectively output one or more example natural language queries in the plurality of example natural language queries based on the scores for the plurality of example natural language queries.

11. A system according to claim 10, further comprising:
a second score generator module to generate scores for the different interpretations of the at least one fragment;
wherein the first score generator module generates scores for the plurality of example natural language queries based on the scores for the different interpretations of the at least one fragment.

12. A system according to claim 10, wherein the first score generator module generates scores for the plurality of example natural language queries based on respective percentages of the one or more tokens utilized in generating respective example natural language queries.

13. A system according to claim 9, further comprising a web page generator module to generate a web page that includes an indication or indications of the one of the plurality of example natural language queries.

14. A system according to claim 13, wherein the web page includes at least one user interface mechanism to permit the user to select one example query of the plurality of example natural language queries.

15. A system according to claim 14, wherein the at least one user interface mechanism provides the indication or indications of the plurality of example natural language queries.

16. A method, comprising:
receiving from a user a query in an imprecise syntax;
transmitting, the query in the imprecise syntax;
receiving at least one user interface mechanism to permit selection of one of at least one example natural language query, the at least one example natural language query having been dynamically generated in response to the query in the imprecise syntax, based on (i) different interpretations of one or more fragments generated by reassembling tokens into which the query in the imprecise syntax has been partitioned and (ii) a plurality of query templates compared to the one or more fragments, wherein at least one of the one or more fragments has multiple portions comprising the tokens, wherein (a) at least some of the plurality of query templates comprise pairs of (i) known categories and (ii) known properties respectively associated with the categories and (b) the at least one example natural language query was generated in response to a determination that a first portion of a fragment matched a category of a first one of the plurality of query templates and a second portion of the fragment matched a property corresponding to the first one of the plurality of query templates;

receiving a user input that corresponds to a selection of one of the at least one example natural language query;

transmitting an indication of the selected example natural language query; and receiving query results in response to the selected example natural language query.

17. A method according to claim 16, further comprising receiving query results corresponding to the query in the imprecise syntax; and displaying the query results corresponding to the query in the imprecise syntax and an indication or indications of the at least one example natural language query in a window on a display device.

18. A method according to claim 17, wherein the at least one user interface mechanism provides the indication or indications of the at least one example natural language query.

\* \* \* \* \*